3,110,206
OVERLOADING PROTECTION DEVICE FOR
COLD CIRCULAR SAWS
Richard Hake, Remscheid-Vieringhausen, Germany, assignor to Fa. Joh. Friedrich Ohler, Maschinenfabrik, Remscheid-Reinshagen, Germany, a corporation of Germany
Filed May 24, 1960, Ser. No. 31,467
2 Claims. (Cl. 83—62)

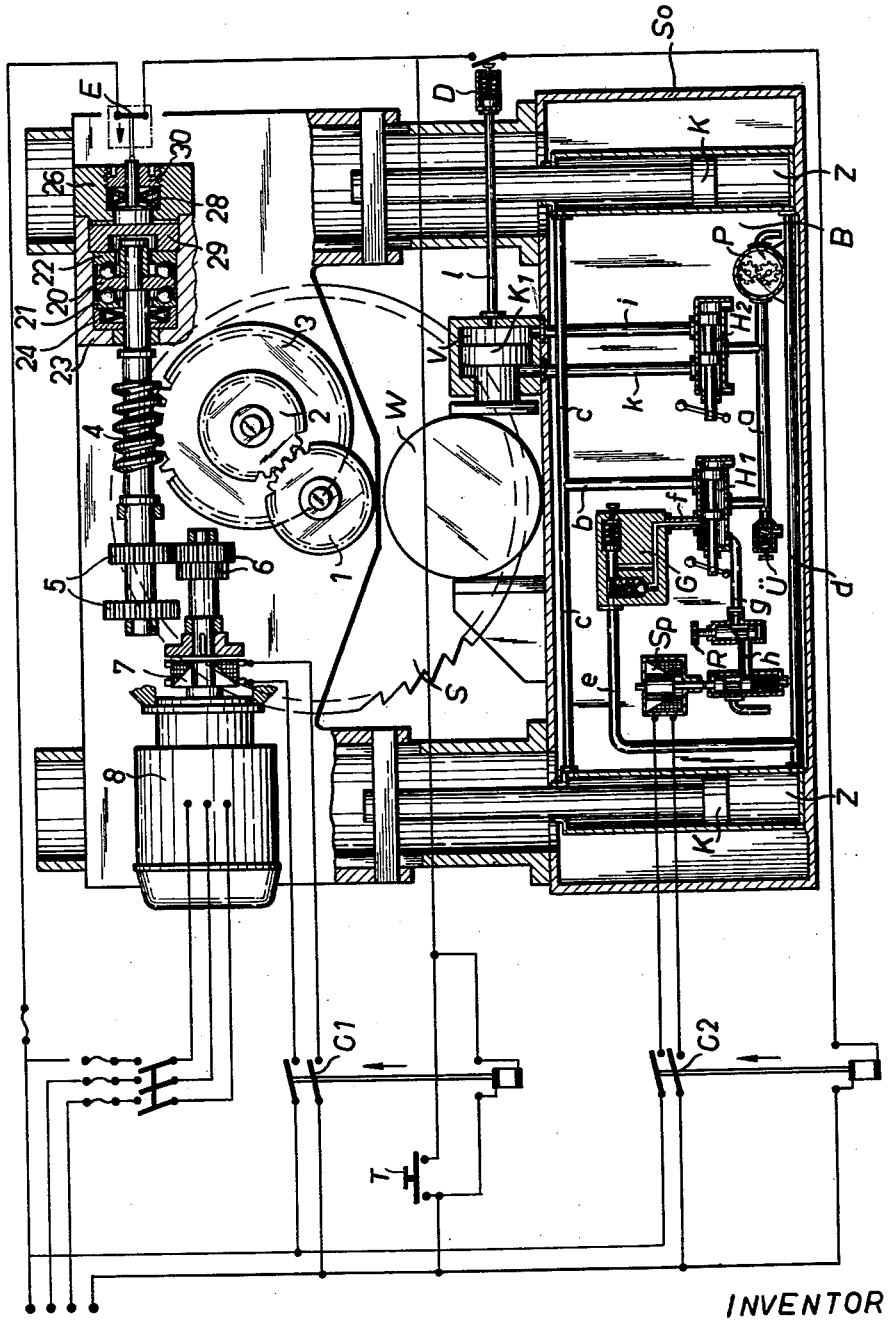

The present invention relates to an overloading protection device for cold circular saws in general, and to such overloading protection device for cold circular saws with an electro-motor driven circular saw, in particular, wherein dependent upon the tangential component of the tooth pressure, the drive for the circular saw and the hydraulic advancing device may be shut off by using an axial displacement of a driving shaft operatively connected with the shaft of the circular saw.

It is one object of the present invention to provide an overloading protection device for cold circular saws which has a particularly suitable and reliable structure.

It is another object of the present invention to provide an overloading protection device for cold circular saws wherein the saw blade is safely protected against damage due to an overload during the working operation.

It is still another object of the present invention to provide an overloading protection device for cold circular saws in order not to overstep the capacity limit of the saw blades, the advancing drive of the cold circular saws is designed in such a manner that the advancing speed is reduced, if the advancing resistance increases.

Devices for the control of the advancing speed, of the advancing pressure or of the advancing capacity are known, by which the control of the cutting size and of the cutting volume may be brought about and which stop the drive for the saw blade upon overstepping a non-permissible advance.

Devices are also known wherein the saw blade is controlled in dependency upon the tangential component of the tooth pressure in such a manner, that the drive for the saw blade is shutoff upon reaching a non-permissible high tangential pressure. The axial movement of a drive shaft operatively connected with the shaft carrying the saw blade is used for this purpose. It is, however, already known to shut off hydraulic advancing devices on tool machnes by using the tangential component of the cutting pressure.

In all these known devices, the drawback can be found that they do not react fast enough in case of sudden and shockwise occurring disturbances, rather that they reduce the advancing speed only after a predetermined time period or brought about the stopping and the return stroke of the saw blade after a predetermined time period, so that damages to the saw blade could not be avoided.

It is yet another object of the present invention to provide an overloading protection device for cold circular saws which avoids these drawbacks.

The present invention is based on the knowledge that a destruction of the saw blades is caused as a rule if hard points or shrinkage or slag inserts in the material lead to sudden and shockwise occurring overloading, if edges on the individual teeth and clogged up gaps of the teeth cause additional friction in the cutting joint, in the case that tensions of the material in the work piece are released during the sawing process and clamp the saw blade or if workpieces turn in the clamping device or are displaced or are loosened and block the saw blade. The damage is caused there as a rule by the drive for the rotary movement, so that the tangential component of the cutting pressure is an appreciable contribution. Yet, the radial component of the cutting pressure may reach likewise values of undesirable size.

It is, therefore, still a further object of the present invention to provide an overloading protection device for cold circular saws which avoid all these drawbacks and difficulties and which provides such a structure for the driving device for the saw, that the saw blade stops immediately at the occurrence of such sudden and shockwise occurring disturbances.

This object is brought about in accordance with the present invention by an arrangement according to which the drive for the saw blade is connected with the general drive by an electromagnetic coupling and the release of the coupling and of the advancing drive takes place over an adjustable pressure sensitive box.

This structure, designed in accordance with the present invention, has the advantage that in case of overloading of the saw drive, the saw blade and the advancing drive stand still immediately, so that any damage and any destruction of the saw blade may safely be avoided and also an undesirable overloading of the drive is eliminated.

With these and other objects in view, which will become apparent in the following detailed description, the present invention will be clearly understood in connection with the accompanying drawing, in which the only FIGURE shows a diagram of the safety arrangement.

Referring now to the drawing, the embodiment of the present invention discloses the saw blade S which is rotatably mounted in the saw slide. The saw blade S is driven by a worm gear drive 1, 2, 3, 4, 5 and 6 by means of the motor 8 which is connected releasably with the drive by means of an electromagnetic coupling 7. Instead of gears and worms, non-gradual shiftable speed drives may be provided.

The worm shaft 4 of the drive transfers its axial force to a longitudinal bearing consisting of the bearing rings 20, 21 and 22 and disposed in the housing, the bearing cover of said bearing being formed as adjustable pressure measuring box 26. The latter contains a plate spring 28 which is pre-tensed between a flange 29 and a threaded nut 30, the spring pressure being adjustable in accordance with a scale. While the bearing ring 21 engages the housing over a distance ring 23 and a spring plate 24, the other bearing ring 22 transfers the end pressure of the worm shaft 4 to the pressure sensitive box 26 by means of a movably mounted flange 29, the pressure sensitive box 26 being connected with the bearing housing by means of screw bolts (not shown).

The operation of this device is as follows:

If the tangential component of the cutting pressure on the saw blade increases, the end pressure of the worm shaft 4 increases in the same relation to the longitudinal bearing and over the flange 29 to the pressure sensitive box 26. At the same moment at which the pre-tensioned pressure of the plate spring 28, which pre-tension pressure has been set by means of the threaded nut 30, is reached or passed, the pressure sensitive box 26 operates the electric switch E, which releases the electromagnetic coupling 7 and disconnects the rotary drive for the saw blade S, whereby simultaneously, as set forth below, the hydraulic advancing drive is likewise stopped. The disconnection of the drive for the saw blade takes place by means of the electromagnetic coupling 7 in such a manner that the latter is controlled by the electric switch E, for instance over the relay C1.

This device reacts very sensitively to sudden overloading, which occurs at the periphery of the saw blade, while during a normal load the bearing rings of the longitudinal bearing and the shaft of the drive do not change their position. The pre-tensioning of the pressure sensitive box may be changed by rotating of the same, whereby the pressure sensitive box 26 may be secured for instance by a key or a seal against improper adjustment. This arrangement is made in such a manner that simultaneously with the shut off of the drive for the saw blade by means of the electromagnetic coupling 7, the advancing movement is likewise stopped.

As it may be ascertained from the hydraulic feeding device shown in the drawing, the advancing drive is disposed in the sump $So$ of the machine. The latter comprises a pump P which has its own driving motor. The pump P sucks oil from the container B and feeds the same at first to the slide feeding cylinders Z by means of a first slide valve $H_1$ and by means of a second slide valve $H_2$ to the cylinder V for the operation of the clamping piston $K_1$ for securing of the workpiece W. The conduits $i$ and $k$ serve alternately for feeding of the oil and for its return, respectively, during clamping and releasing of the workpiece W.

Depending upon the position of the slide valve $H_1$, the piston $K_1$ moves either in advancing or returning direction.

An overpressure valve U is co-ordinated at the end of the pressure conduit to the pump P, at which the required pressure is adjustable. The advancing speed is adjusted in case of the use of an adjustable pump with changeable feeding quantities, or, if a gear pump with constant feeding quantity is used, by means of a regulator R in known manner.

In order to control the advancing movement, the oil is fed from the pump P through the conduits $a$, $b$, $c$ through the slide valve $H_1$ to the piston rod side of the advance cylinder Z, whereby superfluous oil quantities can return into the container B through the overpressure valve U. The oil flowing off the piston side of the advancing cylinder Z moves through the conduits $d$ and $e$ and over an adjustable counter-pressure regulator G through the conduit $f$ to the main slide valve $H_1$ and from there over the conduit $g$ and over a small regulator R through the conduit $h$ to the locking slide valve $Sp$, which releases the return to the container B in the switched on position.

While the pressure of the radial component of the tooth pressure is limited at the counter-pressure regulator G, and, thereby, the advancing speed of the saw slide is automatically reduced with increasing cutting resistance, in order not to overstep the capacity limit of the saw blade, the slide valve $Sp$ locks or closes the return conduit $h$ and, thereby, the advance, if the end switch E opens the circuit to the relay C2 of the locking slide valve.

The rotary movement of the saw blade and the advancing movement of the saw slide are simultaneously shut off.

In the circuit to the relay C2 of the locking slide valve is disposed a pressure sensing device D, which is controlled by the pressure conduit $l$ of the clamping cylinder V. If several clamping devices are provided, the corresponding pressure sensing means are disposed in series. By such arrangement it is avoided that the advance movement of the slide can be started, prior to rigidly clamping the material or work piece. If the clamping pressure falls in the clamping cylinder V to a predetermined limit value, the circuit to the relay C2 is interrupted and the advance is stopped automatically by the release of the locking slide valve $Sp$.

If the saw blade drive and the slide advance drive are shut off due to overloading, the saw blade can be moved out of the cutting slot by reversing of the main slide valve $H_1$. By this measure, the pressure sensitive box 26 is released and the end switch E closes the circuit to the relay C1 and C2. The locking slide valve $Sp$ opens the return conduit $h$ and upon removing of the disturbance the relays C1 of the electromagntic coupling 7 and, thereby, the rotary movement of the saw blade may be started by operation of the switch T and upon reversing of the slide valve $H_1$ the advance movement for the slide may be started again.

It is made possible by the present invention to provide on cold circular saws with devices for automatic adjustment of the volume of the cut piece to the capacity limit of the saw blade an additional overloading protection device, by which the rotary and advancing movement of the saw blade is reliably shut off upon suddenly occurring disturbances and unusual loads. In accordance with the present invention, the present device serves simultaneously for the supervision and the security of workpiece clamps.

While I have disclosed one embodiment of the present invention, it is to be understood that this embodiment is given by example only and not in a limiting sense, the scope of the present invention being determined by the objects and the claims.

I claim:

1. An overloading protecting device for cold circular saws comprising a circular saw blade, an electric motor having a motor shaft, a first shaft carrying said saw blade and including a first gear, a gear train including said first gear and operatively connected with said motor shaft, a second shaft movable in axial direction and disposed in said gear train, an electro-magnetic clutch operatively disposed between said motor shaft and said gear train, a hydraulic advancing device for said saw blade, means including said electro-magnetic clutch for shutting off the driving operation of said gear train and of said hydraulic advancing device in response to the tangential component of the tooth pressure of said saw blade by axial displacement of said second shaft, said shutting off means including an adjustable pressure sensitive box and circuit means responsive to the pressure in said pressure sensitive box for shifting said electromagnetic coupling into inoperative position, thereby disconnecting said electric motor and said advancing drive, the latter including at least one pressure cylinder and a sump, pump means for feeding fluid from said sump to the pressure side of said pressure cylinder, and means responsive to the tangential component of the tooth pressure of said saw blade for return of said fluid from the non-pressure side of said pressure cylinder.

2. The device, as set forth in claim 1, wherein said circuit means include electrically operated means for sensing the position of clamping means for a work piece.

References Cited in the file of this patent

UNITED STATES PATENTS

| | | |
|---|---|---|
| 1,959,292 | Morris | May 15, 1934 |
| 1,972,560 | Heller | Sept. 4, 1934 |
| 2,144,335 | Jensen et al. | Jan. 17, 1939 |
| 2,365,987 | Zimmerman | Dec. 26, 1944 |
| 2,397,974 | Morrow et al. | Apr. 9, 1946 |
| 2,410,695 | Werner | Nov. 5, 1946 |
| 2,511,563 | Bullard | June 13, 1950 |